(12) United States Patent
Chen et al.

(10) Patent No.: US 6,374,236 B1
(45) Date of Patent: Apr. 16, 2002

(54) PARALLEL OPTIMIZED TRIGGERS IN PARALLEL PROCESSING DATABASE SYSTEMS

(75) Inventors: James Chen, Torrance; Chi Kim Hoang, Palo Alto; Mark Anthony Hodgens, San Diego; Frederick Stuart Kaufmann, Irvine; Rolf Günter Erich Stegelmann, Valencia, all of CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/454,729

(22) Filed: Dec. 4, 1999

(51) Int. Cl.[7] .............................................. G06F 17/30

(52) U.S. Cl. ............................................. 707/2; 707/10

(58) Field of Search .......................... 707/2, 1, 10, 100, 707/503, 512, 530; 709/203

(56) References Cited

U.S. PATENT DOCUMENTS 5,873,075 A * 2/1999 Cochrane et al. .............. 707/2

* cited by examiner

Primary Examiner—Thomas Black
Assistant Examiner—Apu Mofiz
(74) Attorney, Agent, or Firm—Gates & Cooper

(57) ABSTRACT

A method, apparatus, and article of manufacture for accessing a subject table in a computer system. The subject table is partitioned across a plurality of processing units of the computer system. A trigger is defined for the subject table, such that when a triggering event occurs on the subject table, a triggered action is performed. Both the triggering event and triggered action can be performed in parallel by the computer system. A spool table is generated for each partition of the subject table, wherein the spool table stores one or more necessary records accessed from the subject table by the triggering event. In this manner, triggered actions that refer to these necessary rows need not access the subject table again.

12 Claims, 4 Drawing Sheets

PARALLEL OPTIMIZED TRIGGERS IN PARALLEL PROCESSING DATABASE SYSTEMS

CROSS-REFERENCE TO RELATED APPLICATION

This application is related to co-pending and commonly-assigned application Ser. No. 09/454,730, filed on same date herewith, blames Chen, Chi Kim Hoang, Mark Hodgens, Fred Kaufmann and Rolf Stegelmann, entitled "VERY LARGE TABLE REDUCTION IN PARALLEL PROCESSING DATABASE SYSTEMS", which application is incorporated by reference herein.

BACKGROUND OF THE INVENTION

1. Field of the Invention

This invention relates in general to database management systems performed by computers, and in particular, to parallel optimized triggers in a parallel processing database system.

2. Description of Related Art

Relational DataBase Management Systems (RDBMS) store data into tables. A table in a relational database is two dimensional, comprising rows and columns. Each column has a name, typically describing the type of data held in that column. As new data is added, more rows are inserted into the table. A user query selects some rows of the table by specifying clauses in SQL (Structured Query Language) statements that qualify the rows to be retrieved based on the values in one or more of the columns.

Database triggers are defined in the 1995 SQL3 ANSI standard for relational database management systems. Triggers are event-driven, specialized procedures attached to a subject table that define some action to take, called a triggered action, when some event, called a triggering event, occurs. Generally, triggering events involve an INSERT, UPDATE or DELETE operation that modifies one or more specified columns in the subject table. Similarly, triggered actions generally involve INSERT, INSERT-SELECT, UPDATE, DELETE, ABORT, ROLLBACK, BEGIN-END, or EXECUTE statements.

There are three types of trigger action times: BEFORE, AFTER and INSTEAD OF. Depending on the trigger action time, a triggered statement "fires" a trigger before, after, or instead of the triggering action. When a triggered statement fires a trigger, a phenomenon called cascading may ensue. In cascading, triggered statements cause trigger events, which result in the execution of other triggered statements. This sequence can repeat and continue until the cascading normally or abnormally ends.

With the advent of data warehouses, it is not uncommon for relational databases to store very large tables. Such tables may range from megabytes to gigabytes, terabytes, or more. As a result, the RDBMS may have to examine thousands, millions, billions, or more, records in the course of one or more triggering events. Moreover, since the triggering event usually relates to records where an INSERT, UPDATE or DELETE operation has modified one or more specified columns in the subject table, it is usually the case where the triggered actions also relate to these records. In the prior art, the necessary records would be retrieved from the table for the triggering event and then again for the triggered action.

Often, however, it may be possible to reduce the number of times a record is retrieved for triggering events and triggered actions. The advantage, of course, is that the table size and record counts for the subsequent triggered actions could be greatly reduced. This would result in faster execution using fewer resources, thereby improving response time and data throughput.

While there have been various techniques developed for optimizing the performance of RDBMS, there is a need in the art for techniques that optimize the performance of database triggers by reducing the size of very large tables and performing the triggers in parallel.

SUMMARY OF THE INVENTION

The present invention discloses a method, apparatus, and article of manufacture for accessing a subject table in a computer system. The subject table is partitioned across a plurality of processing units of the computer system. A trigger is defined for the subject table, such that when a triggering event occurs on the subject table, a triggered action is performed. Both the triggering event and triggered action can be performed in parallel by the computer system. A spool table is generated for the necessary rows accessed from the subject table by the triggering event. In this manner, triggered actions that refer to these necessary rows need not access the subject table again.

An object of the present invention is to optimize the database access on parallel processing computer systems. Another object of the present invention is to improve the performance of database partitions managed by a parallel processing computer systems.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown byway of illustration a specific embodiment in which the invention maybe practiced. It is to be understood that other embodiments may be utilized and structural changes may be made without departing from the scope of the present invention.

OVERVIEW

The present invention, known as parallel optimized database triggers (PODT), performs triggers in a parallel processing database system using a very-large table reduction technique. The advantages of PODT, as compared with traditional triggers, include the parallel execution of triggering events and triggered actions. Parallel optimized database triggers result in faster execution using fewer resources, thereby improving response time and throughput.

ENVIRONMENT

Figure 1:
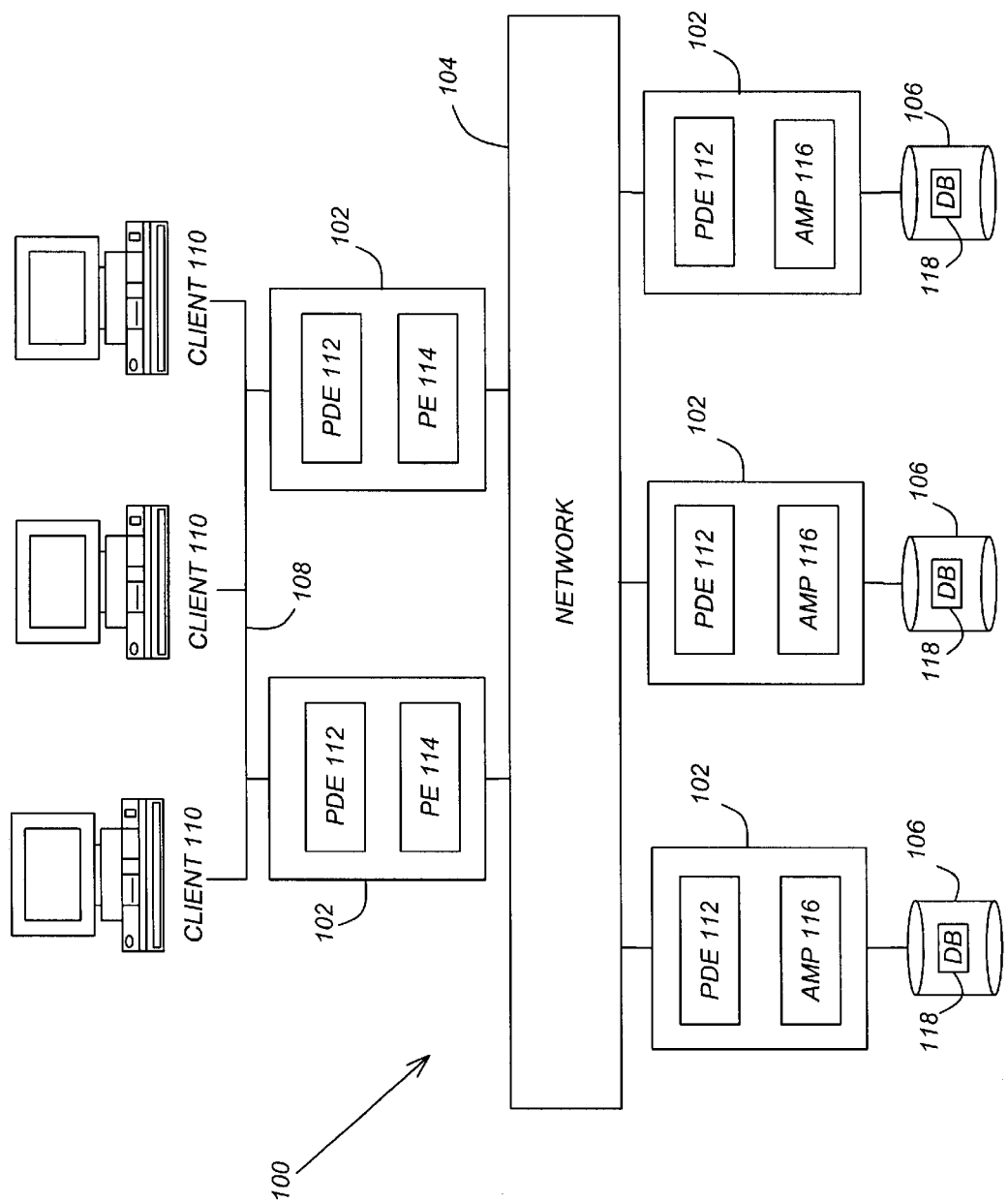
FIG. 1 illustrates an exemplary software and hardware environment that could be used with the present invention.

FIG. 1 illustrates an exemplary hardware and software environment that could be used with the present invention.

In the exemplary environment, a computer system 100 is comprised of one or more processing units (PUs) 102, also known as processors or nodes, which are interconnected by a network 104. Each of the PUs 102 is coupled to zero or more fixed and/or removable data storage units PSUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 typically use a workstation 110, terminal, computer, or other input device to interact with the computer system 100. This interaction generally comprises queries that conform to the Structured Query Language (SQL) standard, and invoke functions performed by Relational DataBase Management System (DBMS) software executed by the system 100.

In the preferred embodiment of the present invention, the RDBMS software comprises the Teradata® product offered by NCR Corporation, and includes one or more Parallel Database Extensions (PDEs) 112, Parsing Engines (PEs) 114, and Access Module Processors (AMPs) 116. These components of the RDBMS software perform the functions necessary to implement the RDBMS and SQL standards, i.e., definition, compilation, interpretation, optimization, database access control, database retrieval, and database update.

Work is divided among the PUs 102 in the system 100 by spreading the storage of a partitioned relational database 118 managed by the RDBMS software across multiple AMPs 116 and the DSUs 106 (which are managed by the AMPs 116). Thus, a DSU 106 maystore only a subset of rows that comprise a table in the partitioned database 118 and work is managed by the system 100 so that the task of operating on each subset of rows is performed by the AMP 116 managing the DSUs 106 that store the subset of rows.

The PEs 114 handle communications, session control, optimization and query plan generation and control. The PEs 114 fully parallelize all functions among the AMPs 116. As a result, the system of FIG. 1 applies a multiple instruction stream, multiple data stream (MIMD) concurrent processing architecture to implement a relational database management system 100.

Both the PEs 114 and AMPs 116 are known as "virtual processors" or "vprocs". The vproc concept is accomplished by executing multiple threads or processes in a PU 102, wherein each thread or process is encapsulated within a vproc. The vproc concept adds a level of abstraction between the multi-threading of a work unit and the physical layout of the parallel processing computer system 100. Moreover, when a PU 102 itself is comprised of a plurality of processors or nodes, the vproc concept provides for intra-node as well as the inter-node parallelism.

The vproc concept results in better system 100 availability without undue programming overhead. The vprocs also provide a degree of location transparency, in that vprocs communicate with each other using addresses that are vproc-specific, rather than node-specific. Further, vprocs facilitate redundancy by providing a level of isolation/abstraction between the physical node 102 and the thread or process. The result is increased system 100 utilization and fault tolerance.

The system 100 does face the issue of how to divide SQL statements or another unit of work into smaller sub-units, each of which can be assigned to an AMP 116. In the preferred embodiment, data partitioning and repartitioning may be performed, in order to enhance parallel processing across multiple AMPs 116. For example, the data maybe hash partitioned, range partitioned, or not partitioned at all (i.e., locally processed). Hash partitioning is a partitioning scheme in which a predefined hash function and map is used to assign records to AMPs 116, wherein the hashing function generates a hash "bucket" number and the hash bucket numbers are mapped to AMPs 116. Range partitioning is a partitioning scheme in which each AMP 116 manages the records falling within a range of values, wherein the entire data set is divided into as many ranges as there are AMPs 116. No partitioning means that a single AMP 116 manages all of the records.

Generally, the RDBMS is tangibly embodied in and/or accessible from a device, media, carrier, or signal, such as RAK ROM one or more of the DSUs 106, and/or a remote system or device communicating with the computer system 100 via one or more of the DCUs 108. The RDBMS comprises logic and/or data which, when executed, invoked, and/or interpreted by the computer system 100, cause the necessary steps or elements of the present invention to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

EXECUTION OF SQL STATEMENTS

Figure 2:
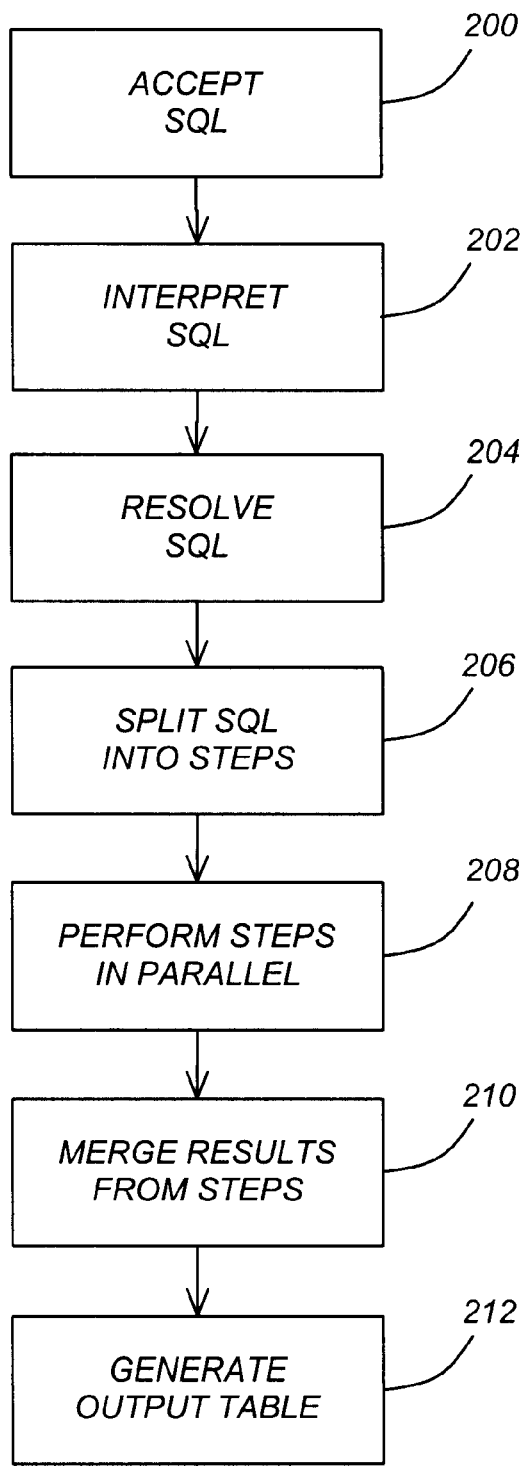
FIG. 2 is a flow chart illustrating the steps necessary for the interpretation and execution of SQL statements according to the preferred embodiment of the present invention.

FIG. 2 is a flow chart illustrating the steps necessary for the interpretation and execution of SQL statements or other user interactions, either in a batch environment or in an interactive environment, according to the preferred embodiment of the present invention.

Block 200 represents the SQL statements being accepted by the PE 114.

Block 202 represents the SQL statements being transformed by an interpreter function of the PE 114.

Block 204 represents the PE 114 resolving symbolic names in the SQL statements using a data dictionary that contains information about all the databases 118 and tables in the system 100.

Block 206 represents the PE 114 splitting the SQL statements into one or more "step messages", wherein each step message is assigned to an AMP 116 that manages the desired records. As mentioned above, the rows of the tables in the database 118 are partitioned or otherwise distributed among multiple AMPs 116, so that multiple AMPs 116 can work at the same time on the data of a given table. If a request is for data in a single row, the PE 114 transmits the steps to the AMP 116 in which the data resides. If the request is for multiple rows, then the steps are forwarded to all participating AMPs 116. Since the tables in the database 118 maybe partitioned or distributed across the DSUs 16 of the AMPs 116, the workload of performing the SQL statements can be balanced among AMPs 116 and DSUs 16.

Block 206 also represents the PE 114 sending the step messages to their assigned AMPS 116.

Block 208 represents the AMPs 116 performing the required data manipulation associated with the step messages received from the PE 114, and then transmitting appropriate responses back to the PE 114.

Block 210 represents the PE 114 then merging the responses that come from the AMPs 116.

Block 212 represents the output or result table being generated.

SQL STATEMENT SYNTAX

The following is a Backus-Naur Format description of the syntax of the SQL statements used with parallel optimized database triggers according to the preferred embodiment of the present invention:

```
<create trigger stmt>::=
    {CREATE|REPLACE}TRIGGER<trigger name>
    [ENABLED|DISABLED]
    <trigger action time><triggering event>ON<table
        name>
    [<order>]
    [referencing>]
    <triggered action>
<trigger action time>::=BEFORE|AFTER|INSTEAD OF
<triggering event>::=
    INSERT|
    DELETE|
    UPDATE[OF<column name list>]
order>::=ORDER integer>
<referencing>::=
    REFERENCING{<new values table alias list>|
        <new values correlation name list>
<new values table alias list>::=
    <new values table alias>
    [<new values table alias>]
<new values table alias>::=
    NEW_TABLE[AS]<identifier>
<new values correlation name list>::=
    <new values correlation name>
    [<new values correlation name>]
<new values correlation name>::=
    NEW[AS]identifier>
<triggered action>::=
    [FOR EACH{ROW|STATEMENT}]
    [WHEN<left paren><search condition><right paren>]
    <triggered SQL statement>
<triggered SQL statement>::=
    <SQL procedure statement>
    BEGIN ATOMIC
    {<SQL procedure statement><semicolon>} . . .
    END
```

GENERAL SYNTAX RULES

The following is a description of the general rules for the preceding syntax according to the preferred embodiment of the present invention:

1. <create trigger stmt> a. A trigger can either be created or replaced. To replace a trigger, REPLACE is specified. If the trigger already exists, it will be replaced. If the trigger does not exist, then it will be created.

b. Trigger names follow the same rules as the database 118 imposes on table, view and macro names. The trigger name can optionally be qualified with the database 118 name, but must be unique within the database 118. If the database 118 name is not specified, the current database 118 is the default. As long as they have the proper access light, a user can create a trigger in another database 118.

c. The ENABLED|DISABLED option enables or disables the trigger at create time. If a trigger is disabled, then it will not fire until the command: ALTER TRIGGER <trigger name>ENABLED is run. ENABLED is the default.

d. The table identified by <able name> is the subject table. Any reference to this table in a subsequent WHEN clause or <triggered SQL statement> is called an outer reference.

2. <trigger action time> a. The trigger action time specifies when a triggered action will be executed. There are three valid choices:

BEFORE—The trigger fires before the triggering event executes.

AFTER—The trigger fires after the triggering event executes.

INSTEAD OF—The trigger fires instead of the triggering event.

3. <triggering event> a. The particular statement that causes the trigger to fire is called the triggering event. In the preferred embodiment, there are only three statements that cause a trigger to fire: INSERT, UPDATE and DELETE.

b. <column name list>

The optional column list only applies to an UPDATE triggering event.

If no list is specified, the default is all columns.

There cannot be duplicate column names in the list.

The column names must identify columns in the subject table.

4. <order> a. Order allows the user to control trigger execution order within a request. Certain rules apply. If more than one trigger defined on the same table has the same trigger action time, triggering event and FOR EACH clause, then the order value determines the execution sequence.

The order rules are very simple. If the user does not assign an order value, then a random null value is assigned and execution is random. These null values will execute after a real order value.

If the user does define an order value, that number governs execution. If it is the same as an existing value, then an error returns to the user.

If the user wants to change a null to a real value, they must recreate the trigger with the desired number.

b. If two triggers have the same trigger action time and triggering event, but one is a FOR EACH ROW and one is a FOR EACH STATEMENT, then:

If the trigger action time is BEFORE or INSTEAD OF, then the FOR EACH STATEMENT trigger is executed before the FOR EACH ROW trigger.

If the trigger action time is AFTER, then the FOR EACH ROW trigger is executed before the FOR EACH STATEMENT trigger.

5. <referencing> a. The REFERENCING clause is used with Row (FOR EACH ROW) and Statement (FOR EACH STATEMENT) triggers. Row and Statement triggers force REFERENCING to assume two personalities. REFERENCING allows a user to either specify a name for a new column value or for a new body of rows resulting from the triggering event. It is not possible to refer to both an individual row and a collection of rows in the same trigger definition.

b. This is optional and there is no default.

c. Outer References

Outer references occur when the <triggered action> or the WHEN clause refer to a column/row in the subject table.

All subject table columns must be qualified with the new correlation name.

All subject table references must be qualified with the new values table alias.

6. <new values table alias list> a. There can be only one <new values table alias>. NEW_TABLE can be specified once, and not more than once, in a trigger definition.

7. <new values table alias> a. NEW_TABLE refers to the collection of rows qualified by the triggering event and does not refer to the entire table, unless the triggering event somehow effects every subject table row. If an UPDATE changed fifty rows in a million row table, NEW_TABLE refers not to the million row table, but to the fifty row tables. NEW_TABLE refers to these rows after they were updated. NEW_TABLE cannot, in turn, be updated.

b. NEW_TABLE accesses the whole collection of rows after UPDATEs or INSERTs are applied, including default values, constraint checks, etc.

c. NEW_TABLE can only be used in conjunction with FOR EACH STATEMENT.

d. If the <triggering event> is DELETE, the NEW_TABLE can not be specified.

e. NEW_TABLE can only be specified once.

f. The scope of the NEW_TABLE name (<identifier>) is the entire trigger definition and the name can be the same as the subject table, any name referenced in the <new values correlation name list>, or any table name referenced in the WHEN clause or triggered event.

8. <new values correlation name list> a. There can be only one <new correlation name>. NEW can each be specified once, an not more than once, in a trigger definition.

9. <new values correlation name> a. NEW accesses the new column values of the row being effected by the triggering event. The new column value is the value after execution of the triggering event after the defaults are applied and constraints checked.

b. NEW can only be used in conjunction with FOR EACH ROW.

c. If the <triggering event> is DELETE, then NEW can not be specified.

d. NEW can only be specified once.

e. The scope of the NEW name (<identifier>) is the entire trigger definition and the name can be the same as the subject table, any name referenced in the <new values table alias list>, or any table name referenced in the WHEN clause or triggered action.

10. <triggered action> a. A triggered action cannot INSERT, UPDATE or DELETE to the subject table. This prevents recursion and a possible endless loop. Triggers can cascade, which means that a triggered action can fire a trigger in another table, which in tarn can fire a trigger in yet another table. Cascading triggers are governed by this same recursion rule. While not currently the ANSI standard, the rule is a useful subset. Another embodiment may address this problem by limiting cascading triggers to a fixed number.

b. [FOR EACH{ROW|STATEMENT}]

i. ROW tells the trigger to fire for each processed row.

ii. STATEMENT tells the trigger to fire once per statement.

iii. If ROW or STATEMENT is not specified, then the default is STATEMENT.

c. [WHEN<left paren><search condition><right paren>]

i. This is the search condition and it evaluates to a TRUE/FALSE result.

Aggregates are not allowed in the WHEN clause unless specified in a subquery.

ii. A FALSE evaluation does not effect the triggering event. It cannot cause a rollback ii. WHEN primarily pertains to ROW triggers; it has limited applications for statement triggers.

iv. This is optional and there is no default.

e. If the WHEN clause or the triggered action contain a reference to the subject table, this is called an outer reference.

11. <triggered SQL statement> a. INSERT (including INSERT/SELECT), UPDATE, DELETE, and ABORT/ROLLBACK are the only valid statements executed in a trigger. A macro containing any combination of these valid statements can also be executed in a trigger. A semicolon only with no statement is also valid.

b. This can be either a single statement or multiple statements bracketed by a BEGIN ATOMIC-END block The ANSI standard prohibits transaction statements such as BEGIN, END, COMMIT and ROLLBACK and statements that change session attributes from being triggered SQL statements. The preferred embodiment takes this a step further and limits this group to INSERTs, UPDATEs and DELETEs. INSERT/SELECT falls under the INSERT umbrella. However, SELECTS, DDL statements and other such statements will initially not be allowed in the preferred embodiment. Other embodiments might expand the triggered SQL statement variety to include displays, alerts, SELECTs, DDLs, and even IF,THEN, ELSE constructs common to stored procedures. But, most trigger functionality stems from INSERT, UPDATE, DELETE, and ABORT/ROLLBACK statements.

c. As mentioned in the <triggered action>section, triggers cannot recurse. Triggered action statements cannot operate on the subject table. Cascading triggers abide by the same rule.

d. Triggered SQL statements are executed in the order in which they are specified.

OPERATION OF PARALLEL OPTIMIZED DATABASE TRIGGERS

Figure 3:
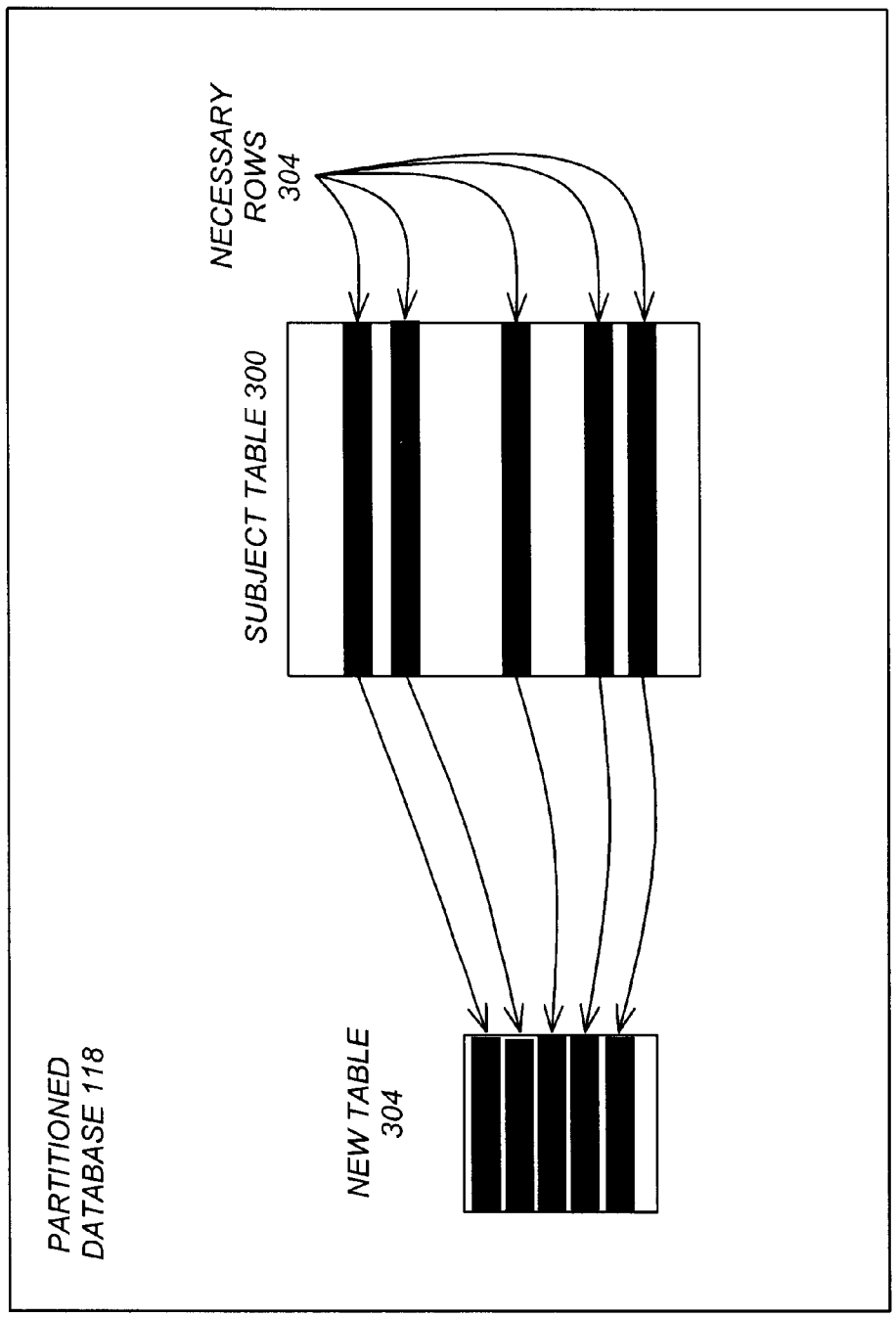
FIG. 3 is a block diagram that illustrates the data structures according to the preferred embodiment of the present invention.

FIG. 3 is a block diagram that illustrates the data structures according to the preferred embodiment of the present invention. As mentioned above, the rows of a subject table 300 in the database 118 are partitioned or otherwise distributed among multiple AMPs 116, so that multiple AMPs 116 can work at the same time on the data of a given table 300.

According to the preferred embodiment, triggers are interpreted by the PE 112 and split into one or more "step messages", wherein each step message is assigned to an AMP 116 and associated partition, and each AMP 116 may receive multiple step messages. Further, each step message may result in the AMP 116 performing multiple actions against the subject table.

As noted above, the triggers may include a REFERENCING clause, which allows a WHEN clause and triggered actions to view the new values of the rows from the subject table 300 resulting from the execution of the triggering event. In this example, the REFERENCING clause results in a smaller subset of records being generated and stored in the spool table 302. The records retrieved from the subject table 300 and stored in this spool table 302 are known as necessary rows 304.

Like the subject table 300, the spool table 302 is partitioned or otherwise distributed among multiple AMPs 116, so that multiple AMPs 116 can work at the same time on the records of the spool table 302. The advantage of using the partitioned spool table 302, instead of using the entire subject table 300, is that only the necessary rows 304 may need to be accessed by the triggered actions. Thus, while the number of records in each partition of the subject table 300 maybe quite large, the number of rows in each partition of the spool table 302 may be much less. As a result, the AMP 116 has faster access to the necessary rows 304 for scans, joins, index retrievals, aggregation, and other operations of the SQL statements.

Moreover, an optimizer function performed either by the PE 114 or the AMP 116 can use smaller demographics (e.g., rows, cardinality, etc.) from the spool table 302 to generate more efficient execution plans for the triggering events and triggered actions, wherein the execution plans use the spool table 302, as well as any other tables accessed in tandem with the spool table 302. This results in faster execution of triggering events and triggered actions using fewer resources, thus improving response time and throughput.

LOGIC OF THE PREFERED EMBODIMENT

Figure 4:
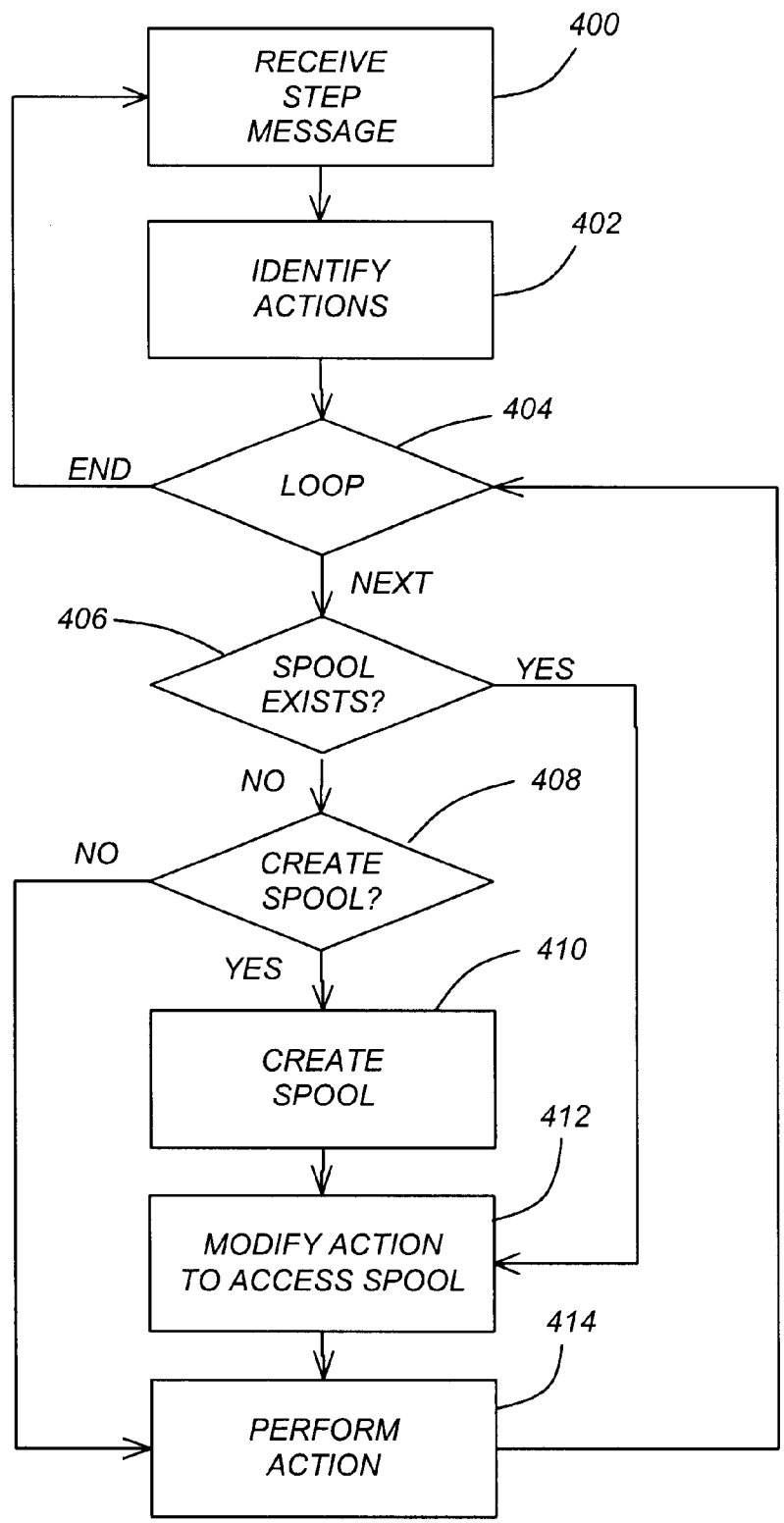
FIG. 4 is a flowchart that illustrates the logic performed according to the preferred embodiment of the present invention.

FIG. 4 is a flowchart that illustrates the logic performed according to the preferred embodiment of the present invention. In the preferred embodiment, this logic is performed at Block 208 of FIG. 2.

Block 400 represents an AMP 116 receiving one or more step messages from the PE 114.

Block 402 represents the AMP 116 identifying one or more actions performed for each of the step messages.

Block 404 is a decision block that represents the AMP 116 looping through the actions. For each action, control transfers to Block 406. Upon completion of the loop, control transfers back to Block 400.

Block 406 is a decision block that represents the AMP 116 determining whether a spool table 302 already exists that can be used by the action. If so, control transfers to Block 412; otherwise, control transfers to Block 408.

Block 408 is a decision block that represents the AMP 116 determining whether a spool table 302 should be created for the action (and subsequent actions). This occurs, for example, when the action comprises a triggering event, and a trigger is defined on the subject table 300 that includes a REFERENCING clause, which allows a WHEN clause and triggered actions to view the new values of the rows from the subject table 300 resulting from the execution of the triggering event. If a spool table 302 should be created, control transfers to Block 410; otherwise, control transfers to Block 414.

Block 410 represents the AMP 116 generating the spool table 302 by analyzing the action (and subsequent actions) to identify the necessary rows 304, retrieve the necessary rows 304 from the subject table 300, and then store the necessary rows 304 into the spool table 302.

Block 412 represents the AMP 116 modifying the action to access the spool table 302 rather than the subject table 300.

Block 414 represents the AMP 116 performing the action, either on the subject table 300 or the spool table 302. When the action comprises a triggering event, and a trigger is defined on the subject table 300, this may result in a triggered action being performed as well.

Thereafter, control returns to Block 400.

CONCLUSION

This concludes the description of the preferred embodiment of the invention. The following paragraphs describe some alternative embodiments for accomplishing the same invention.

In one alternative embodiment, any type of computer, such as a mainframe, minicomputer, or personal computer, could be used to implement the present invention. In addition, any DBMS or other program that performs similar functions.

In another alternative embodiment, the partitions of the table need not be spread across separate data storage devices. Instead, the partitions could be stored on one or a few data storage devices simply to minimize the amount of temporary data storage required at each of the steps of the method.

In yet another alternative embodiment, the steps or logic could be performed by more or fewer processors, rather than the designated and other processors as described above. For example, the steps could be performed simultaneously on a single processor using a multitasking operating environment.

In summary, the present invention discloses a method, apparatus, and article of manufacture for accessing a subject table in a computer system. The subject table is partitioned across a plurality of processing units of the computer system. A trigger is defined for the subject table, such that when a triggering event occurs on the subject table, a triggered action is performed. Both the triggering event and triggered action can be performed in parallel by the computer system. A spool table is generated for each partition of the subject table, wherein the spool table stores a subset of necessary records retrieved from the subject table by the triggering event. In this manner, triggered actions that refer to these necessary rows need not access the subject table again.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for accessing a subject table in a computer system, comprising:

(a) defining a trigger for a subject table partitioned across a plurality of processing units of a computer system, wherein each of the processing units manages at least one partition of the subject table;

(b) performing a triggering event in the computer system as defined by the trigger, wherein the triggering event is split into a plurality of step messages in order to access the subject table partitioned across a plurality of processing units of the computer system, each of the step messages is assigned to one of the processing units managing one or more of the partitions of the subject table, and at least some of the step messages can be performed simultaneously and in parallel by the processing units;

(c) generating a spool table in the computer system in response to the triggering event, wherein the spool table stores one or more necessary records accessed from the subject table by the triggering event, the spool table has a plurality of partitions, each of the partitions of the spool table corresponds to one of the partitions of the subject table, and each of the processing units manages at least one of the partitions of the spool table; and (d) performing a triggered action in the computer system as defined by the trigger and in response to the triggering event, wherein the triggered action is split into a plurality of step messages in order to access the necessary records stored in the spool table, each of the step messages is assigned to one of the processing units managing one or more of the partitions of the spool table, and at least some of the step messages can be performed simultaneously and in parallel by the processing units.

2. The method of claim 1, wherein the generating step (c) further comprises:

retrieving the necessary records from the partition of the subject table, and storing the necessary records into the corresponding partition of the spool table.

3. The method of claim 1, wherein an optimizer function uses information from the spool table to generate more efficient execution plans for the triggered actions.

4. The method of claim 1, wherein a definition of the trigger includes a REFERENCING clause that allows a user to specify a name for the spool table.

5. An apparatus for accessing a subject table in a computer system, wherein the table has a plurality of partitions, comprising:

(a) a computer system having a plurality of processing units, each with zero or more data storage devices coupled thereto, wherein the data storage devices store at least one subject table;

(b) logic, performed by the computer system, for:

(1) defining a trigger for a subject table partitioned across a plurality of processing units of a computer system, wherein each of the processing units manages at least one partition of the subject table;

(2) performing a triggering event in the computer system as defined by the trigger, wherein the triggering event is split into a plurality of step messages in order to access the subject table partitioned across a plurality of processing units of the computer system, each of the step messages is assigned to one of the processing units managing one or more of the partitions of the subject table, and at least some of the step messages can be performed simultaneously and in parallel by the processing units;

(3) generating a spool table in the computer system in response to the triggering event, wherein the spool table stores one or more necessary records accessed from the subject table by the triggering event, the spool table has a plurality of partitions, each of the partitions of the spool table corresponds to one of the partitions of the subject table, and each of the processing units manages at least one of the partitions of the spool table; and (4) performing a triggered action in the computer system as defined by the trigger and in response to the triggering event, wherein the triggered action is split into a plurality of step messages in order to access the necessary records stored in the spool table, each of the step messages is assigned to one of the processing units managing one or more of the partitions of the spool table, and at least some of the step messages can be performed simultaneously and in parallel by the processing units.

6. The apparatus of claim 5, wherein the logic for generating (3) further comprises logic for:

retrieving the necessary records from the partition of the subject table, and storing the necessary records into the corresponding partition of the spool table.

7. The apparatus of claim 5, wherein an optimizer function uses information from the spool table to generate more efficient execution plans for the triggered actions.

8. The apparatus of claim 5, wherein a definition of the trigger includes a REFERENCING clause that allows a user to specify a name for the spool table.

9. An article of manufacture embodying logic for accessing a subject table in a computer system, the logic comprising:

(a) defining a trigger for a subject table partitioned across a plurality of processing units of a computer system, wherein each of the processing units manages at least one partition of the subject table;

(b) performing a triggering event in the computer system as defined by the trigger, wherein the triggering event is split into a plurality of step messages in order to access the subject table partitioned across a plurality of processing units of the computer system, each of the step messages is assigned to one of the processing units managing one or more of the partitions of the subject table, and at least some of the step messages can be performed simultaneously and in parallel by the processing units;

(c) generating a spool table in the computer system in response to the triggering event, wherein the spool table stores one or more necessary records accessed from the subject table by the triggering event, the spool table has a plurality of partitions, each of the partitions of the spool table corresponds to one of the partitions of the subject table, and each of the processing units manages at least one of the partitions of the spool table; and (d) performing a triggered action in the computer system as defined by the trigger and in response to the triggering event, wherein the triggered action is split into a plurality of step messages in order to access the necessary records stored in the spool table, each of the step messages is assigned to one of the processing units managing one or more of the partitions of the spool table, and at least some of the step messages can be performed simultaneously and in parallel by the processing units.

10. The method of claim 9, wherein the generating step (c) further comprises:

retrieving the necessary records from the partition of the subject table, and storing the necessary records into the corresponding partition of the spool table.

11. The method of claim 9, wherein an optimizer function uses information from the spool table to generate more efficient execution plans for the triggered actions.

12. The method of claim 9, wherein a definition of the trigger includes a REFERENCING clause that allows a user to specify a name for the spool table.

* * * * *